United States Patent
Gusyev

(10) Patent No.: US 11,290,050 B2
(45) Date of Patent: Mar. 29, 2022

(54) DEVICE FOR PROTECTING AN ELECTRICAL MACHINE

(71) Applicant: Bayerische Motoren Werke Aktiengesellschaft, Munich (DE)

(72) Inventor: Igor Gusyev, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 31 days.

(21) Appl. No.: 16/957,601

(22) PCT Filed: Mar. 27, 2019

(86) PCT No.: PCT/EP2019/057754
§ 371 (c)(1),
(2) Date: Jun. 24, 2020

(87) PCT Pub. No.: WO2019/206551
PCT Pub. Date: Oct. 31, 2019

(65) Prior Publication Data
US 2020/0350848 A1    Nov. 5, 2020

(30) Foreign Application Priority Data

Apr. 25, 2018   (DE) ..................... 10 2018 206 336.2

(51) Int. Cl.
*H02P 29/028*   (2016.01)
*H02P 25/22*    (2006.01)

(52) U.S. Cl.
CPC ............ *H02P 29/028* (2013.01); *H02P 25/22* (2013.01)

(58) Field of Classification Search
CPC .............................. H02P 29/028; H02P 25/22

USPC .......................... 318/496, 495, 494
See application file for complete search history.

(56) References Cited

U.S. PATENT DOCUMENTS

| | | | |
|---|---|---|---|
| 8,884,559 B2 * | 11/2014 | Murata ................ | B62D 5/0487 318/400.22 |
| 9,692,349 B2 * | 6/2017 | Lee ..................... | H02P 29/0241 |
| 2009/0251831 A1 | 10/2009 | Shiba et al. | |
| 2017/0197730 A1 | 7/2017 | Lutze et al. | |

(Continued)

FOREIGN PATENT DOCUMENTS

| | | |
|---|---|---|
| DE | 11 2007 001 594 T5 | 5/2009 |
| DE | 10 2013 213 045 A1 | 1/2015 |

(Continued)

OTHER PUBLICATIONS

International Search Report (PCT/ISA/210) issued in PCT Application No. PCT/EP2019/057754 dated Jun. 18, 2019 with English translation (five (5) pages).

(Continued)

*Primary Examiner* — David Luo
(74) *Attorney, Agent, or Firm* — Crowell & Moring LLP

(57) ABSTRACT

An apparatus for protecting an electrical machine in the event of a fault, the electrical machine having six phase terminals includes a monitoring unit for detecting a fault of the electrical machine and a switchover unit for switching the electrical machine from a normal operating state into a short-circuit operating state if a fault of the electrical machine is detected. The switchover unit is designed to short-circuit the six phase terminals of the electrical machine asynchronously in accordance with a predefined pattern.

12 Claims, 3 Drawing Sheets

(56) References Cited

U.S. PATENT DOCUMENTS

2017/0264229 A1* 9/2017 Murata .................. B60L 7/003
2018/0244308 A1   8/2018 Furukawa et al.

FOREIGN PATENT DOCUMENTS

| DE | 10 2015 207 117 A1 | 1/2016 |
| DE | 10 2016 220 602 A1 | 9/2017 |
| WO | WO 2017/077567 A1 | 5/2017 |

OTHER PUBLICATIONS

German-language Written Opinion (PCT/ISA/237) issued in PCT Application No. PCT/EP2019/057754 dated Jun. 18, 2019 (seven (7) pages).

German-language Office Action issued in German Application No. 10 2018 206 336.2 dated Nov. 7, 2018 (four (4) pages).

* cited by examiner

DEVICE FOR PROTECTING AN ELECTRICAL MACHINE

BACKGROUND AND SUMMARY OF THE INVENTION

The present invention relates to an apparatus for protecting an electrical machine in the case of a fault. Moreover, the present invention relates to a method for protecting an electrical machine in the case of a fault and to a computer program product, which has a program code embodied to prompt on a computer, in particular a controller, the execution of such a method.

Electrical machines such as, e.g., permanently excited synchronous machines can be used in many technical fields. By way of example, such permanently excited synchronous machines, which are usually three-phase motors, are used in motor vehicles. Should more than three phases be required, for example to facilitate a better power division among a plurality of lines, it is possible to connect together e.g. three-phase machines. For the provision of six phases, two three-phase machines can be connected together, with the phases being offset from one another in each case. Alternatively, a six-phase machine can be provided directly, the six phases being offset from one another therein.

For safety reasons, precautions have to be taken in this case for an operating state in the case of a fault. One option here for setting such an operating state is the active short circuit (AKS). Therein, the terminals of electrical machines are short-circuited by means of suitable switching elements. This can avoid damage during the occurrence of voltages that are too high, as occur in the case of a fault.

However, transient short circuit currents may arise during an active short circuit; these may be quite large and may likewise lead to damage in the drive. In order to avoid such damage, approximate dimensioning of the drive components can be implemented; however, this is very complicated.

Against this background, an object of the present invention is that of protecting an electrical machine with six phase terminals and its driving circuit from damage by transient currents in a simple manner.

Accordingly, an apparatus for protecting an electrical machine in the case of a fault is proposed. The electrical machine has six phase terminals in this case. A monitoring unit is provided to detect a fault of the electrical machine. By way of example, a fault can be identified in this case if a voltage at the phase terminals of the electrical machine exceeds a predetermined threshold or if a phase-to-phase short circuit or an inter-winding fault or further faults are detected.

A switchover unit is provided for such a case, for switching the electrical machine from a normal operating state into a short circuit operating state. Here, the switchover unit is configured to asynchronously short-circuit the six phase terminals of the electrical machine according to a predefined pattern. This means that the individual phase terminals are short-circuited with an offset from one another, i.e., with a delay of a phase terminal. Here, two, three or four phase terminals can be short-circuited with or without delay at the same time.

Asynchronously short-circuiting the six phase terminals as per a predefined pattern allows a reduction in the transient (phase) currents, which may occur during the active short circuit. This reduction in the phase currents has a positive effect on the service life of the components in the driving circuit for the electrical machine. Moreover, the components used in the process can be also dimensioned to be weaker and consequently be dimensioned more cost-effectively on account of the low expected phase currents. Likewise, the reduced transient phase currents also have a positive effect on the dimensioning and the service life of the electrical machine itself.

The respective unit, for example the switchover unit, can be implemented in terms of hardware and/or else in terms of software. In the case of an implementation in terms of hardware, the respective unit can be embodied as an apparatus or as part of an apparatus, for example as a logic circuit. In the case of an implementation in terms of software, the respective unit can be embodied as a computer program product, as a function, as a routine, as part of a program code running on a controller, or as an executable object.

According to an embodiment, the apparatus has a memory unit for storing a predefined pattern as a lookup table. In particular, a plurality of predefined patterns are stored in the memory unit. A suitable stored pattern can easily be selected on the basis of current parameters of the electrical machine. Here, the pattern defines the phase switching pattern, i.e., the sequence and the offset with which the various phases are short-circuited.

By way of example, the switchover unit can be configured to select one of the plurality of predefined patterns on the basis of a current angle of the rotor of the electrical machine. In the process, it is possible to always select the pattern stored for an angle which, proceeding from a predefined angle tolerance, is closest to the current angle. Consequently, the switchover unit can select one of the plurality of predefined patterns on the basis of a predefined angle tolerance range.

According to a further embodiment, the switchover unit is configured to select one of the plurality of predefined patterns on the basis of a desired variant for switching off the rotor of the electrical machine. Here, the variant can be a suppression of transient short circuit currents or a discharge of a DC link capacitor.

Various variants can be stored in respect of the progression of a controlled active short circuit. Here, either an immediate activation of the short circuit operating state or a delayed activation of the short circuit operating state can be implemented.

When suppressing transient currents, the rotor coming to one of the optimal positions (electrical angle) can be awaited in the case of time-uncritical faults; thereafter, the controlled active short circuit can be carried out in accordance with a stored pattern. In this case, the most efficient suppression of transient currents can be obtained.

Should the active short circuit have to be carried out immediately, the most optimum switching pattern can be selected depending on the rotor position, said most optimum switching pattern still facilitating a significant suppression of transient currents.

According to a further embodiment, the predefined pattern defines a delay between a short-circuit of the first, second, third, fourth, fifth, and sixth phase terminal.

Experiments have shown that the transient currents can be optimally suppressed in the case of a positive and a negative electromagnetic moment if the following equations are satisfied:

$$U_{d1} = U_{q1} = U_{min}; \text{ where } U_{q1} > 0 (T_e > 0)$$

$$|U_{d1}| = U_{q1} = U_{max}; \text{ where } U_{q1} < 0 (T_e < 0)$$

A rotating dq-system is used in these equations, with driving the electrical machine being implemented by means of a space vector representation in this system. Since six phases have to be driven, two subspaces are used in the dq-system, i.e., $d_1$, $q_1$ and $d_2$, $q_2$. When driving the electrical machine, one quadrature-axis phase voltage $U_{q1}$, $U_{q2}$ and one direct-axis phase voltage $U_{d1}$, $U_{d2}$ arise in each subspace. Here, $U_{d1}$ represents the direct-axis phase voltage and $U_{q1}$ represents the quadrature-axis phase voltage in the first subspace. The second subspace does not play a role for determining the short circuits of the phases.

Different switching patterns which satisfy these conditions can be ascertained on the basis of these equations and can be stored. A six phase inverter with 12 switching elements can have a total of 64 switching states. Here, the switching patterns define switching states in which the voltages $U_{d1}$ and $U_{q1}$ reach their minimum and maximum value, respectively. The phase voltages can be transformed into the aforementioned $d_1/q_1/d_2/q_2$-coordinate system in the various switching states and in the case of a change of the electrical rotor angle from 0 to 2n.

Tables 1 and 2 present exemplary optimal switching patterns and the corresponding optimal rotor positions (electrical rotor angle $\Theta_{el}$). Table 1 shows exemplary optimal switching patterns for a positive moment of the electrical machine and table 2 shows exemplary optimal switching patterns for a negative moment of the electrical machine. Here, 12 optimal combinations are shown, with the rotor angle changing from 0 to 2n, in each case through 30°.

TABLE 1

Optimal angles for a positive moment in the case of the following condition:
$U_{d1} = U_{q1} = \min$

| $\Theta_{e1}$ | Phases $u_1$, $v_1$, $w_1$, $u_2$, $v_2$, $w_2$ |
|---|---|
| π/6 | 0 0 1 0 0 1 |
| π/3 | 1 0 1 0 0 1 |
| π/2 | 1 0 1 1 0 1 |
| 2π/3 | 1 0 0 1 0 1 |
| 5π/6 | 1 0 0 1 0 0 |
| Π | 1 1 0 1 0 0 |
| 7π/6 | 1 1 0 1 1 0 |
| 4π/3 | 0 1 0 1 1 0 |
| 3π/2 | 0 1 0 0 1 0 |
| 5π/3 | 0 1 1 0 1 0 |
| 11π/6 | 0 1 1 0 1 1 |
| 2π (0) | 0 0 1 0 1 1 |

TABLE 2

Optimal angles for a negative moment in the case of the following condition:
$|U_{d1}| = U_{q1} = \max$

| $\Theta_{e1}$ | Phases $u_1$, $v_1$, $w_1$, $u_2$, $v_2$, $w_2$ |
|---|---|
| π/6 | 0 1 1 0 1 0 |
| π/3 | 0 1 1 0 1 1 |
| π/2 | 0 0 1 0 1 1 |
| 2π/3 | 0 0 1 0 0 1 |
| 5π/6 | 1 0 1 0 0 1 |
| Π | 1 0 1 1 0 1 |
| 7π/6 | 1 0 0 1 0 1 |
| 4π/3 | 1 0 0 1 0 0 |
| 3π/2 | 1 1 0 1 0 0 |
| 5π/3 | 1 1 0 1 1 0 |
| 11π/6 | 0 1 0 1 1 0 |
| 2π (0) | 0 1 0 0 1 0 |

The conditions can be satisfied by virtue of the corresponding phases being short-circuited with a time offset so that the necessary voltages can be briefly built up. By way of example, in the case of the switching pattern $u_1=1$, $v_1=1$, $w_1=0$, $u_2=1$, $v_2=1$, $w_2=0$ (where $u_1$, $v_1$, $w_1$, $u_2$, $v_2$, $w_2$ each represent a phase) following the occurrence of a fault, the short circuits of the phases $u_1$, $v_1$, $u_2$, $v_2$ are delayed by a definable time $\Delta t$ in comparison with the phases $w_1$, $w_2$.

According to a further aspect, a method for protecting an electrical machine in the case of a fault is proposed, wherein the electrical machine has six phase terminals. The method includes the following steps: detecting a fault of the electrical machine and switching the electrical machine from a normal operating state into a short circuit operating state should a fault of the electrical machine be detected, wherein the six phase terminals of the electrical machine are asynchronously short-circuited according to a predefined pattern.

The embodiments and features described for the proposed apparatus apply analogously to the proposed method.

Furthermore, a computer program product is proposed, the latter having a program code embodied to prompt on a computer, in particular a controller, the execution of the method as described above.

A computer program product, such as a computer program means, can be provided or supplied, for example, as a storage medium, such as a memory card, USB stick, CD-ROM or DVD, or else in the form of a file that is downloadable from a server in a network. By way of example, in a wireless communications network, this can be implemented by transmitting a corresponding file with the computer program product or the computer program means.

Further possible implementations of the invention also comprise combinations, not explicitly mentioned, of features or embodiments described above or below in respect of the exemplary embodiments. Here, a person skilled in the art will also add individual aspects to the respective basic form of the invention as improvements or supplements.

Further advantageous configurations and aspects of the invention are the subject matter of the dependent claims and the exemplary embodiments of the invention described in the following. Below, the invention is explained in more detail on the basis of preferred embodiments, with reference being made to the attached figures.

In the figures, equivalent or functionally equivalent elements have been provided with the same reference sign, provided nothing else has been specified.

DETAILED DESCRIPTION OF THE DRAWINGS

Figure 1:
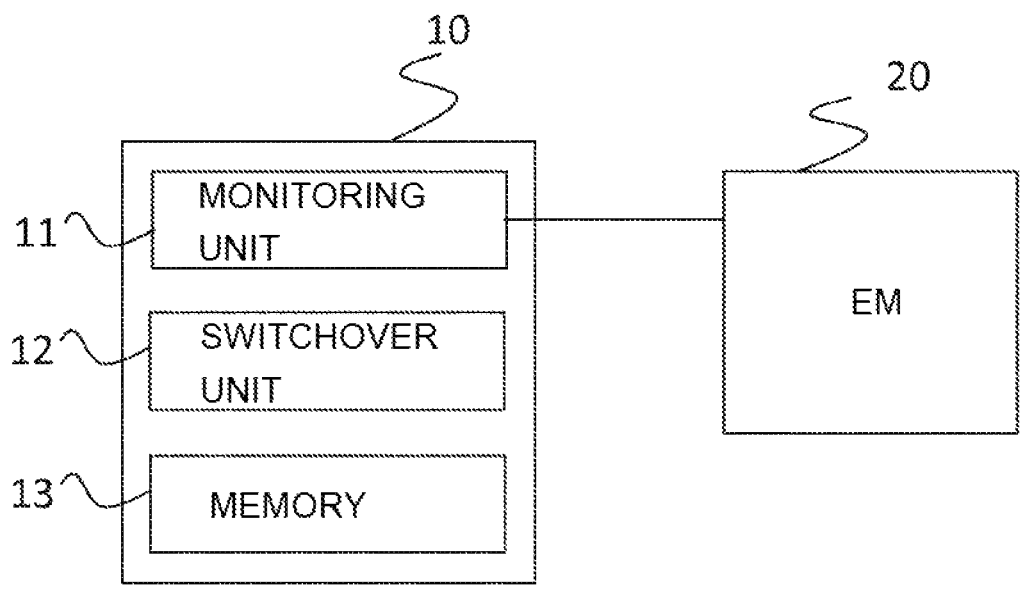
FIG. 1 is a schematic block diagram of an apparatus for protecting an electrical machine in the case of a fault.

FIG. 1 shows an apparatus 10 for protecting an electrical machine 20 in the case of a fault. The electrical machine 20 has six phase terminals $u_1$, $v_1$, $w_1$, $u_2$, $v_2$, $w_2$, as described in more detail in conjunction with FIGS. 2 and 3.

A monitoring unit 11 of the apparatus 10 monitors the electrical machine 20 and detects the occurrence of a fault. If such a fault is detected, the switchover unit 12 switches the electrical machine 20 from a normal operating state into a short circuit operating state. In order to achieve this, the six phase terminals $u_1$, $v_1$, $w_1$, $u_2$, $v_2$, $w_2$ of the electrical machine 20 are asynchronously short-circuited according to a predefined pattern.

Figure 2:
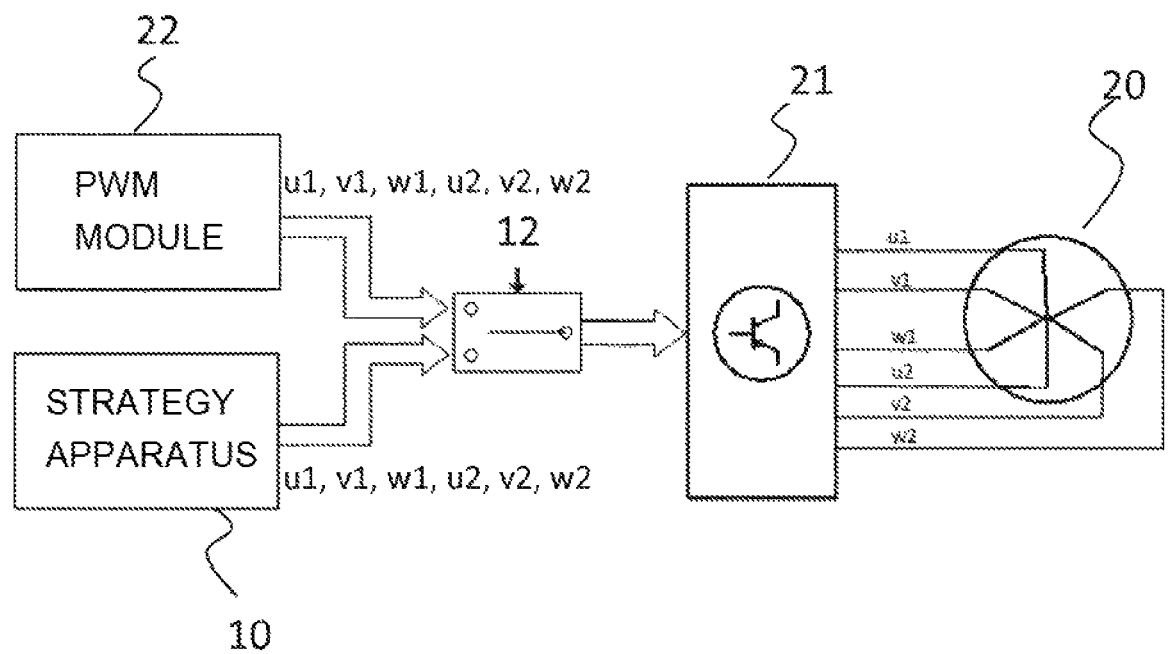
FIG. 2 is a schematic block diagram of the apparatus of FIG. 1 in the overall surroundings of the electrical machine.
Figure 3:
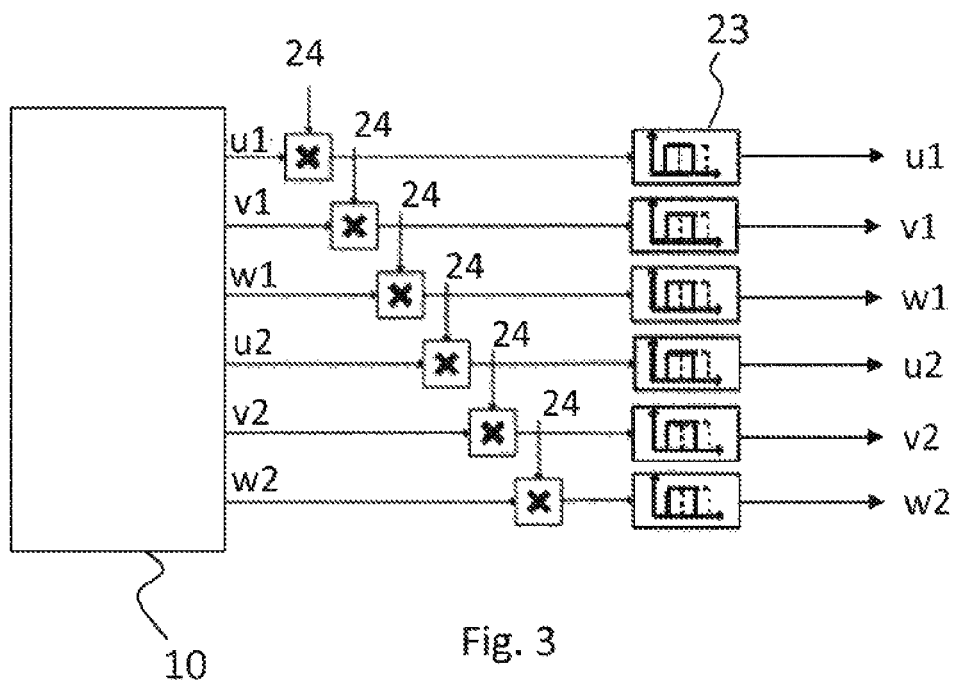
FIG. 3 is a schematic illustration of the principle of the apparatus of FIG. 1.

The principle of this switchover is now explained in more detail in conjunction with FIGS. 2 and 3.

The monitoring unit 11 transmits a signal indicating operation under emergency conditions to the switchover unit 12.

Following the reception of the signal indicating operation under emergency conditions, the generation of inverter control pulses is switched to a logical operation under emergency conditions, provided by the apparatus 10 in FIG. 1, by the PWM nominal operation module 22.

In the process, the apparatus 10 carries out an optimal switch off strategy by way of the inverter 21 within the meaning of a suppression of transient short-circuit currents. The optimal switch off pattern is selected on the basis of a current electrical rotor angle, an angle tolerance and the selection of a variant following the input of a signal indicating operation under emergency conditions. In the variants, a distinction can be made between the following options:
1. Immediately carrying out the active short circuit, the switch off pattern being optimized for the suppression of transient short-circuit currents.
2. Carrying out the active short circuit in one of the plurality of optimal rotor positions, the switch off pattern being optimized for the suppression of transient short-circuit currents.

The generated or selected optimal switch off pattern for the phase $u_1\{0,1\}$, $v_1\{0,1\}$, $w_1\{0,1\}$, $u_2\{0,1\}$, $v_2\{0,1\}$, $w_2\{0,1\}$ is multiplied by the required switch off time offsets 24. These offsets or delays are generated in block 23 of FIG. 3.

In the generated inverter control pulses, the time of the short-circuit for two, three or four phases is delayed by the switch off time offset in order to optimally suppress the transient currents during the switching of the active short circuit.

Figure 4:
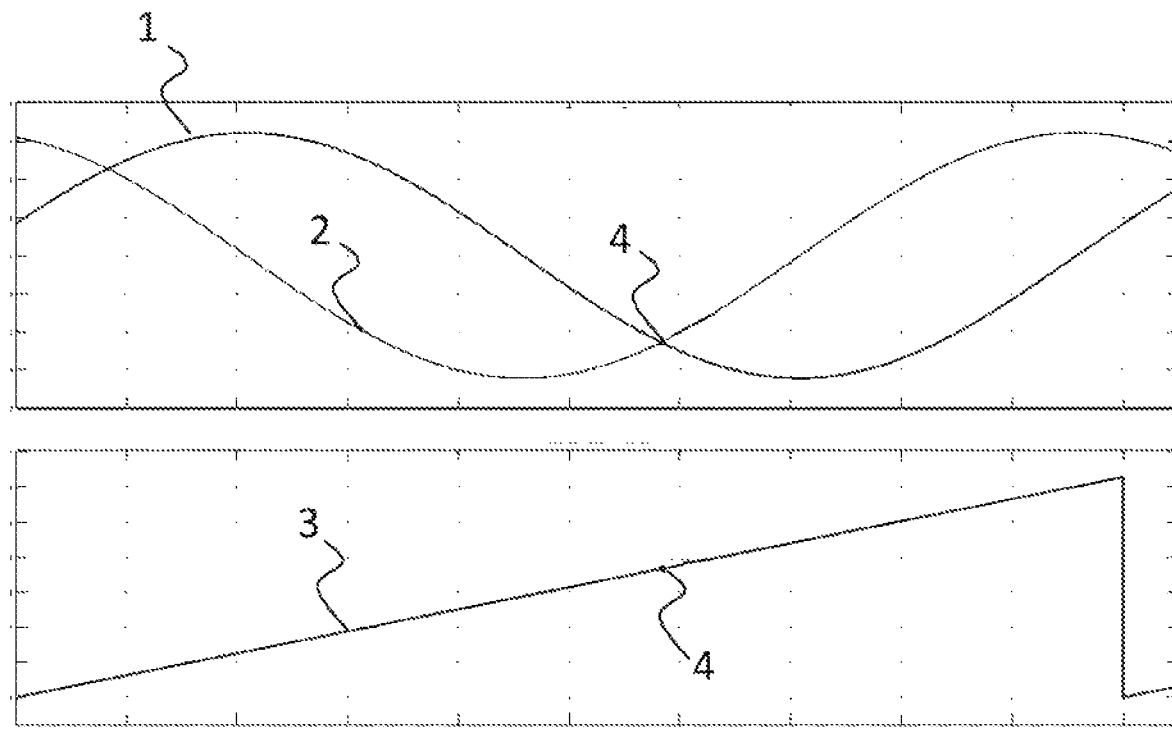
FIG. 4 shows exemplary curves of the quadrature-axis and direct-axis phase voltages of the electrical machine.

An example for the curves of the quadrature-axis and direct-axis phase voltages $U_{d1}$ (1) and $U_{q1}$ (2) is shown in FIG. 4, top. In this case, the switching pattern 1, 1, 0, 1, 1, 0 is used. In order to ensure optimal suppression of the transient short-circuit currents, the phases $w_1$, $w_2$ were initially short-circuited at optimal rotor angle 4 ($U_{d1}=U_{q1}=\min$), followed by the phases $u_1$, $v_1$, $u_2$, $v_2$. The lower diagram in FIG. 4 shows the rotor angle 3. As is evident, there is one optimum rotor angle 4 per period 0-2π.

Figure 5:
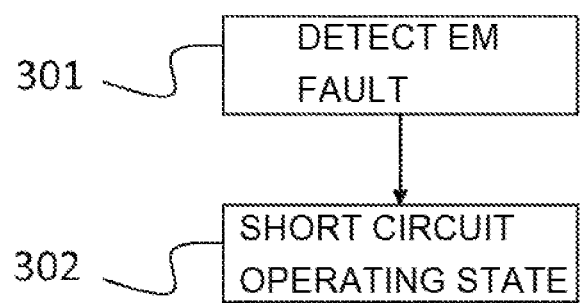
FIG. 5 is a schematic flow chart of a method for protecting an electrical machine in the case of a fault.

FIG. 5 shows a method for protecting an electrical machine 20 in the case of a fault. The method includes the following steps:

A fault of the electrical machine 20 is detected in a first step 301.

Subsequently, in a second step 302, the electrical machine 20 is switched from a normal operating state to a short circuit operating state, wherein the six phase terminals $u_1$, $v_1$, $w_1$, $u_2$, $v_2$, $w_2$ of the electrical machine 20 are asynchronously short-circuited according to a predefined pattern.

The proposed apparatus renders it possible to suppress the transient short-circuit currents by a factor of 1.5 to 2. Since there is no need for approximate dimensioning of the electrical machine and the power electronics, this is accompanied by lower costs and less installation space. Moreover, no additional hardware is required. Additionally, the DC link capacitor can be discharged during the active short circuit.

Although the present invention was described on the basis of exemplary embodiments, it is modifiable in multifaceted ways.

LIST OF REFERENCE SIGNS

1 $U_d$
2 $U_q$
3 Rotor angle
4 Optimal rotor angle
10 Apparatus
11 Monitoring unit
12 Switchover unit
13 Memory
20 Electrical machine
21 Inverter
22 PWM nominal operation
23 Delay generation
24 Delay
301-302 Method steps

What is claimed is:

1. An apparatus for protecting an electrical machine in case of a fault, wherein the electrical machine has six phase terminals, comprising:
a monitoring unit for detecting a fault of the electrical machine; and
a switchover unit for switching the electrical machine from a normal operating state into a short circuit operating state should a fault of the electrical machine be detected, wherein
the switchover unit is configured to asynchronously short-circuit the six phase terminals of the electrical machine according to a predefined pattern,
the apparatus further comprises a memory that is configured to store a plurality of predefined patterns,
each of the plurality of predefined patterns is stored in the memory as a lookup table, and
the switchover unit is configured to select one of the plurality of predefined patterns as the predefined pattern.

2. The apparatus according to claim 1, wherein
the switchover unit is configured to select one of the plurality of predefined patterns on the basis of a current angle of the rotor of the electrical machine.

3. The apparatus according to claim 2, wherein the switchover unit is configured to select one of the plurality of predefined patterns on the basis of a predefined angle tolerance range.

4. The apparatus according to claim 3, wherein
the switchover unit is configured to select one of the plurality of predefined patterns on the basis of a desired variant for switching off the electrical machine.

5. The apparatus according to claim 2, wherein
the switchover unit is configured to select one of the plurality of predefined patterns on the basis of a desired variant for switching off the electrical machine.

6. The apparatus according to claim 1, wherein the switchover unit is configured to select one of the plurality of predefined patterns on the basis of a desired variant for switching off the electrical machine.

7. The apparatus according to claim 6, wherein the desired variant is an immediate activation of the short circuit operating state or a delayed activation of the short circuit operating state.

8. The apparatus according to claim 1, wherein the predefined pattern defines a delay between a short-circuit of the first, second, third, fourth, fifth, and sixth phase terminal.

9. The apparatus according to claim 1, wherein the switchover unit is configured to select one of the plurality of predefined patterns on the basis of a predefined angle tolerance range.

10. A method for protecting an electrical machine in case of a fault, wherein the electrical machine has six phase terminals, comprising:
   detecting a fault of the electrical machine; and
   switching the electrical machine from a normal operating state into a short circuit operating state should a fault of the electrical machine be detected, wherein
   the six phase terminals of the electrical machine are asynchronously short-circuited according to a predefined pattern,
   the predefined pattern is selected from a plurality of predefined patterns, and
   each of the plurality of predefined patterns is stored in a memory as a lookup table.

11. A computer product having a non-transitory computer readable medium having stored thereon program code that, when executed by a computer, causes the computer to:
   detect a fault of the electrical machine; and
   switch the electrical machine from a normal operating state into a short circuit operating state should a fault of the electrical machine be detected, wherein
   the six phase terminals of the electrical machine are asynchronously short-circuited according to a predefined pattern,
   the predefined pattern is selected from a plurality of predefined patterns, and
   each of the plurality of predefined patterns is stored in a memory as a lookup table.

12. An apparatus for protecting an electrical machine in case of a fault, wherein the electrical machine has six phase terminals, comprising:
   a monitoring unit for detecting a fault of the electrical machine; and
   a switchover unit for switching the electrical machine from a normal operating state into a short circuit operating state should a fault of the electrical machine be detected, wherein
   the switchover unit is configured to asynchronously short-circuit the six phase terminals of the electrical machine according to a predefined pattern, and
   the predefined pattern defines a delay between a short-circuit of the first, second, third, fourth, fifth, and sixth phase terminal.

\* \* \* \* \*